United States Patent
Strelec et al.

(10) Patent No.: US 9,519,731 B2
(45) Date of Patent: Dec. 13, 2016

(54) DETERMINING A HEATING, VENTILATION, AND AIR CONDITIONING MODEL FOR A BUILDING

(75) Inventors: Martin Strelec, Morristown, NJ (US); Karel Marik, Morristown, NJ (US)

(73) Assignee: Honeywell International Inc., Morris Plains, NJ (US)

( * ) Notice: Subject to any disclaimer, the term of this patent is extended or adjusted under 35 U.S.C. 154(b) by 791 days.

(21) Appl. No.: 13/564,413

(22) Filed: Aug. 1, 2012

(65) Prior Publication Data
US 2014/0039844 A1  Feb. 6, 2014

(51) Int. Cl.
*G06F 17/50* (2006.01)
*G06G 7/48* (2006.01)

(52) U.S. Cl.
CPC .......... *G06F 17/50* (2013.01); *G06F 17/5004* (2013.01); *G06F 2217/80* (2013.01)

(58) Field of Classification Search
CPC ... G06F 17/50; G06F 17/5004; G06F 2217/80
USPC ....................................................... 703/1, 6
See application file for complete search history.

(56) References Cited

U.S. PATENT DOCUMENTS

| | | | | |
|---|---|---|---|---|
| 6,134,511 | A * | 10/2000 | Subbarao | 703/6 |
| 8,606,374 | B2 * | 12/2013 | Fadell | F24F 11/006 700/278 |
| 9,031,703 | B2 * | 5/2015 | Nakamura | G05B 13/026 165/208 |
| 9,081,374 | B2 * | 7/2015 | Madrazo | G01D 4/002 |
| 2007/0219764 | A1 * | 9/2007 | Backe et al. | 703/6 |
| 2008/0120068 | A1 * | 5/2008 | Martin et al. | 703/1 |
| 2008/0120069 | A1 * | 5/2008 | Martin et al. | 703/1 |
| 2010/0121613 | A1 * | 5/2010 | Rosca et al. | 703/1 |
| 2011/0077779 | A1 * | 3/2011 | Fuller et al. | 700/276 |
| 2012/0072181 | A1 * | 3/2012 | Imani | 703/1 |
| 2012/0316807 | A1 * | 12/2012 | Madrazo | G01D 4/002 702/61 |
| 2013/0338970 | A1 * | 12/2013 | Reghetti | 703/1 |

OTHER PUBLICATIONS

Metamodeling, Wikipedia, printed Feb. 20, 2015, pp. 1-8.*
Samuel Privara, et al. "Model predictive control of a building heating system: The first experience", Feb.-Mar. 2011, Energy and Buildings 43.2, pp. 564-572.*
Ferkl and Siroky, "Ceiling radiant cooling: Comparison of ARMAX and subspace identification modelling methods", 2010, Building and Environment 45.1, pp. 205-212.*
Ferkl and Siroky, "Model of a hot water full circulation mode in a building", 2009, ICCA, IEEE International Conference on Control and Automation, pp. 585-590.*

* cited by examiner

*Primary Examiner* — Kamini S Shah
*Assistant Examiner* — Juan Ochoa
(74) *Attorney, Agent, or Firm* — Brooks, Cameron & Huebsch, PLLC

(57) ABSTRACT

Devices, methods, and systems for determining a heating, ventilation, and air conditioning (HVAC) model for a building are described herein. One method includes receiving a description of the building, receiving an HVAC meta-model, wherein the HVAC meta-model is independent of the building, and determining an HVAC model for the building based on the description of the building and the HVAC meta-model.

17 Claims, 2 Drawing Sheets

DETERMINING A HEATING, VENTILATION, AND AIR CONDITIONING MODEL FOR A BUILDING

TECHNICAL FIELD

The present disclosure relates to devices, methods, and systems for determining a heating, ventilation, and air conditioning model for a building.

BACKGROUND

A heating, ventilation, and air conditioning (HVAC) system can be used to control the environment of a building. For example, an HVAC system can be used to control the air temperature of different rooms, areas, and/or spaces of a building.

An HVAC system of a building (e.g., the components of the HVAC system) may be autonomously and/or continuously controlled by a control system (e.g., supervisory controller) installed, deployed, set up, and/or maintained by an application engineer. For example, the control system may reset various set points of the HVAC system, such as, for instance, supply water, air temperature, and/or air speed, depending on the conditions of the building. The control system may control the HVAC system using, for example, a model of the HVAC system.

An HVAC system model, however, can be complex and can differ from building to building. Accordingly, setting up an HVAC model for a building can be a complex task, for which an application engineer may need significant system modeling background, training, and/or experience. This can increase the cost of setting up and/or deploying the HVAC model, and/or can increase the amount of time and/or effort expended by the application engineer in setting up and/or deploying the HVAC model, which can be prohibitive for the practical applicability of the HVAC model.

DETAILED DESCRIPTION

Figure 1:
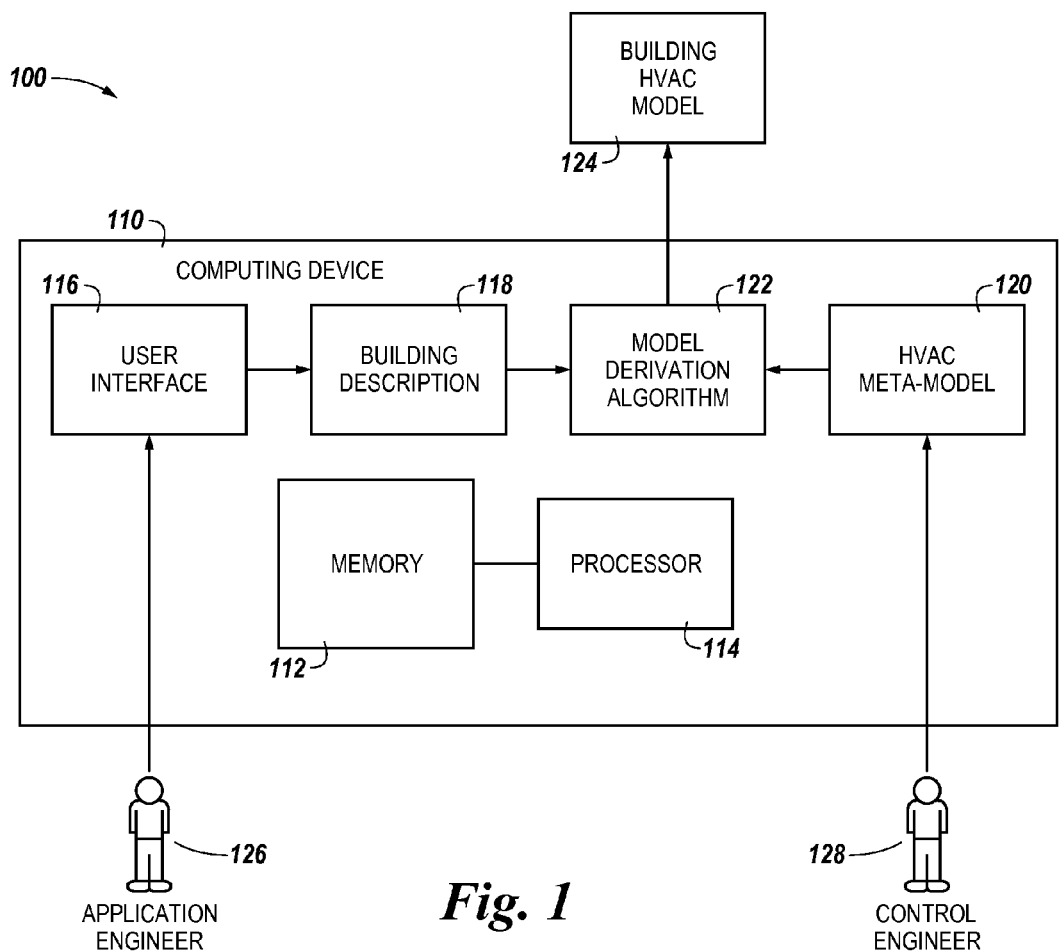
FIG. 1 illustrates a system for determining a heating, ventilation, and air conditioning (HVAC) model for a building in accordance with one or more embodiments of the present disclosure.

Devices, methods, and systems for determining a heating, ventilation, and air conditioning (HVAC) model for a building are described herein. For example, one or more embodiments include receiving a description of the building, receiving an HVAC meta-model, wherein the HVAC meta-model is independent of the building, and determining an HVAC model for the building based on the description of the building and the HVAC meta-model.

Determining an HVAC model for a building in accordance with one or more embodiments of the present disclosure can be less complex than previous approaches for determining HVAC models. For example, an application engineer may not need any system modeling background, training, and/or experience to determine an HVAC model for a building in accordance with one or more embodiments of the present disclosure. Rather, the application engineer may only need knowledge of the structure of the HVAC system to determine the HVAC model.

Accordingly, one or more embodiments of the present disclosure can reduce the cost of determining an HVAC model for a building, and/or can reduce the amount of time and/or effort expended by the application engineer in determining the HVAC model, as compared with previous approaches. As such, HVAC models determined in accordance with one or more embodiments of the present disclosure can have broader applicability than HVAC models determined in accordance with previous approaches.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 118 may reference element "18" in FIG. 1, and a similar element may be referenced by 218 in FIG. 2.

As used herein, "a" or "a number of" something can refer to one or more such things. For example, "a number of rules" can refer to one or more rules.

FIG. 1 illustrates a system 100 for determining a heating, ventilation, and air conditioning (HVAC) model for a building in accordance with one or more embodiments of the present disclosure. As shown in FIG. 1, system 100 includes a computing device 110 having a memory 112 and a processor 114. Computing device 110 can be, for example, a laptop computer, a desktop computer, or a mobile device (e.g., a mobile phone, a personal digital assistant, etc.), among other types of computing devices.

Memory 112 can be any type of storage medium that can be accessed by processor 114 to perform various examples of the present disclosure. For example, memory 112 can be a non-transitory computer readable medium having computer readable instructions (e.g., computer program instructions) stored thereon that are executable by processor 114 to determine an HVAC model for a building a building in accordance with one or more embodiments of the present disclosure.

Memory 112 can be volatile or nonvolatile memory. Memory 112 can also be removable (e.g., portable) memory, or non-removable (e.g., internal) memory. For example, memory 112 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 112 is illustrated as being located in computing device 110, embodiments of the present disclosure are not so limited. For example, memory 112 can also be located internal to another computing resource (e.g., enabling computer readable instructions to be downloaded over the Internet or another wired or wireless connection).

As shown in FIG. 1, computing device 110 can also include a user interface 116. User interface 116 can be, for example, a graphical user interface (GUI) that includes, for example, a display (e.g., a screen). The display can be, for instance, a touch-screen (e.g., the GUI can include touch-screen capabilities).

Computing device 110 can receive information (e.g., input) from a user of computing device 110 through an interaction with the user via user interface 116. The user can enter the input into computing device 110 using, for instance, a mouse and/or keyboard associated with computing device 110 (e.g., user interface 116), and/or by touching user interface 116 in embodiments in which user interface 116 includes a touch-screen.

For example, computing device 110 can receive a description 118 of a building from an application engineer 126 of the building via user interface 116, as illustrated in FIG. 1. The building description 118 can be, for example, a description of an HVAC system of the building.

Building description 118 can be model independent. For instance, building description 118 can be independent of HVAC meta-model 120, as will be further described herein.

Building description 118 can include, for example, contextual (e.g., hierarchal) information about the building (e.g., about the HVAC system of the building). Contextual information about the building can include, for example, components of the HVAC system of the building and relationships between the components.

The components of the HVAC system can include, for example, an object(s), control component(s), equipment(s), device(s), network(s), area(s), space(s) (e.g., open spaces), room(s), sensor(s), and/or actuator(s) of the HVAC system such as, for instance, a chiller(s) (e.g., chiller plant), boiler(s) (e.g., boiler plant), pump(s), fan(s), air damper(s) such as a variable air volume (VAV) damper, air handling unit(s) (AHUs) (e.g., AHU plant), coil(s) such as a heating and/or cooling coil, air filter(s), and/or cooling tower(s). Relationships between the HVAC components can include, for example, physical connections and/or energy flow between the components, such as a chain of equipment (e.g., duct work, pipes, and/or electrical and/or gas distribution equipment) that connects the components. However, embodiments of the present disclosure are not limited to a particular type of HVAC component or relationship between HVAC components. An example of a description of an HVAC system of a building will be further described herein (e.g., in connection with FIG. 2).

As shown in FIG. 1, computing device 110 includes an HVAC meta-model 120. HVAC meta-model 120 can be a building independent HVAC model description. That is, HVAC meta-model 120 can be independent of the building (e.g., independent of building description 118).

HVAC meta-model 120 can be received from a source other than application engineer 126, such as, for example, a control engineer (e.g., an advanced HVAC control engineer) 128, as illustrated in FIG. 1. However, embodiments of the present disclosure are not limited to a particular source for HVAC meta-model 120. For example, in some embodiments, HVAC meta-model 120 can be received from a controller manufacturer, a solution provider, or solution support.

Further, HVAC meta-model 120 can be hidden from application engineer 126. For example, HVAC meta-model 120 can be a default setup of computing device 110 (e.g., HVAC meta-model 120 can be defined as part of an installation file of computing device 110) stored in computing device 110 (e.g., in memory 112) as, for instance, an XML file, a script, etc.

HVAC meta-model 120 can include a number of rules for determining (e.g., building) an HVAC model. The rules can, for example, define a structural relationship between a number of inputs, outputs, and/or disturbances of the HVAC model. The inputs can include, for example, temperature and/or velocity. The outputs can include, for example, heating and/or cooling demands. The disturbances can include, for example, temperature (e.g., outside air temperature).

Additionally and/or alternatively, the rules for determining the HVAC model can include a number of rules for aggregated (e.g., computed) variables and parameters of the HVAC model. The aggregated variables can include, for example, mean and/or maximum values, such as a mean cooling demand. The parameters can include, for example, orders and/or delays associated with individual variables.

As shown in FIG. 1, computing device 110 includes an HVAC model derivation algorithm 122. HVAC model derivation algorithm 122 can automatically determine (e.g., derive and/or generate) an HVAC model 124 for (e.g., specific to) the building based on (e.g., using) building description 118 and HVAC meta-model 120. For example, HVAC model derivation algorithm 122 can determine the building HVAC model 124 by applying the number of rules for determining an HVAC model of HVAC meta-model 120 to building description 118 (e.g., to the contextual information about the building contained in building description 118).

The building HVAC model 124 can be, for example, a dynamical model. For example, the building HVAC model can change based on the behavior and/or operating conditions of the HVAC system. The operating conditions of the HVAC system can include, for example, operational and/or performance values associated with (e.g., of and/or at) the components of the HVAC system such as, for instance, temperature, air flow, humidity, air pollutants, liquid (e.g., water) flow, and/or energy consumption associated with the components. The behavior of the HVAC system can include, for example, a change(s) in the operating conditions of the components of the HVAC system.

Additionally and/or alternatively, the building HVAC model 124 can be a predictive model. For example, the building HVAC model can control the operation of the HVAC system based on predicted operating conditions of the system (e.g., predicted operating conditions of the components of the system). Further, in some embodiments, the building HVAC model 124 can include a final structure for the building HVAC model.

In some embodiments, the building HVAC model 124 can be used by a model predictive controller and/or optimizer to control (e.g., supervise the control of) the HVAC system (e.g., the components of the HVAC system) of the building. For example, the building HVAC model 124 can set the temperature of different areas, spaces, and/or rooms of the building such that the energy (e.g., gas and/or electricity)

consumption and/or operational costs of the HVAC system or reduced (e.g., minimized) while still meeting the comfort needs of the building.

In some embodiments, the building HVAC model 124 can detect problems associated with the HVAC system of the building. The problems associated with the HVAC system of the building can include, for example, faults, abnormalities (e.g., abnormal performance characteristics), and/or errors, such as mechanical faults and/or control errors, associated with the components of the HVAC system. For instance, the problem can be that an operating condition (e.g., an operational and/or performance value) associated with one of the components of the HVAC system is not within a performance assessment rule and/or control chart for that component. As an example, the problem can be a temperature exception associated with a component of the system (e.g., the temperature of that component is outside a particular temperature range). Further, in some embodiments, the building HVAC model 124 can simulate operation of the HVAC system (e.g., of the components of the HVAC system) of the building.

Figure 2:
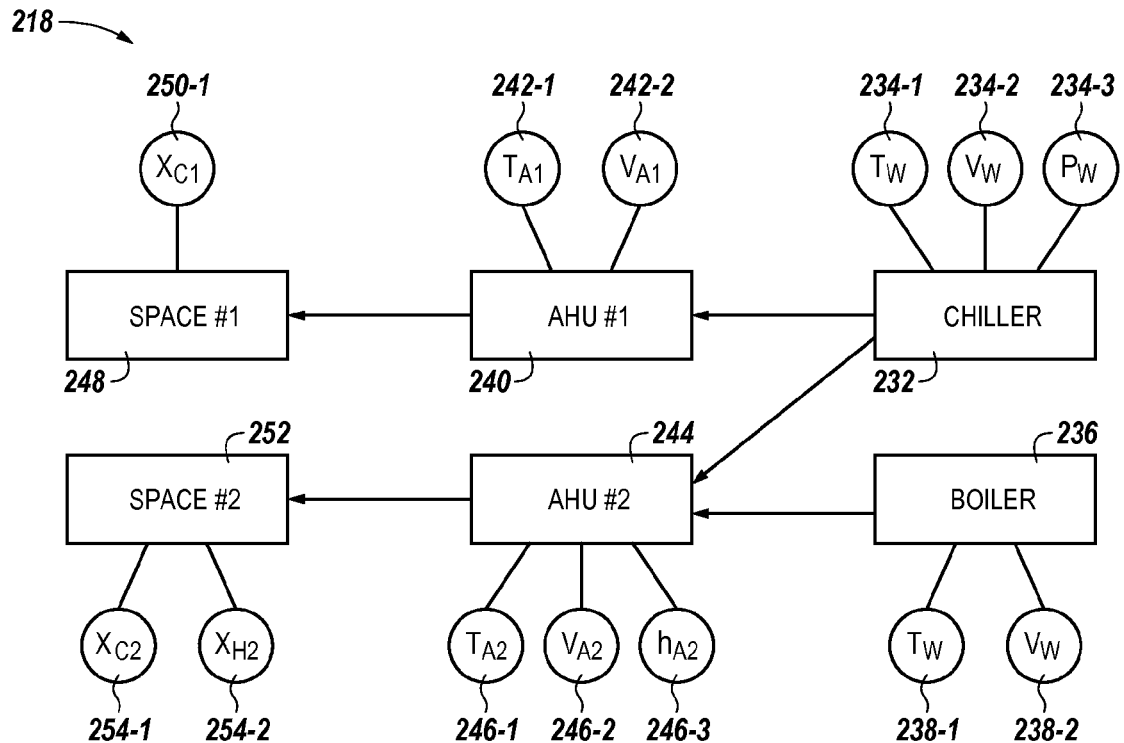
FIG. 2 illustrates an example of a description of an HVAC system of a building in accordance with one or more embodiments of the present disclosure.

FIG. 2 illustrates an example of a description 218 of an HVAC system of a building in accordance with one or more embodiments of the present disclosure. The building HVAC system description 218 can be an example of building description 118 received from application engineer 126, as previously described in connection with FIG. 1.

As shown in FIG. 2, the building HVAC system description 218 includes a number of connected nodes 232, 236, 240, 244, 248, and 252. Each node represents a different component of the HVAC system of the building. For example, as illustrated in FIG. 2, node 232 represents a chiller (e.g., a chiller plant) of the HVAC system of the building, node 236 represents a boiler (e.g., a boiler plant) of the HVAC system of the building, node 240 represents a first AHU (e.g., a first AHU plant) of the HVAC system of the building, node 244 represents a second AHU (e.g., a second AHU plant) of the HVAC system of the building, node 248 represents a first space (e.g., a first open space) of the HVAC system of the building, and node 252 represents a second space (e.g., a second open space) of the HVAC system of the building.

The connections (e.g., arrows) between nodes 232, 236, 240, 244, 248 and 252 illustrated in FIG. 2 represent the relationships between the components of the HVAC system of the building. For instance, as shown in the example illustrated in FIG. 2, the chiller of the HVAC system of the building is connected to the first and second AHUs of the HVAC system of the building, the boiler of the HVAC system of the building is connected to the second AHU, the first AHU is connected to the first space of the HVAC system of the building, and the second AHU is connected to the second space of the HVAC system of the building. The connections between the components can include, for example, physical connections and/or energy flow between the components, such as a chain of equipment that connects the components, as previously described herein (e.g., in connection with FIG. 1).

As shown in FIG. 2, the building HVAC system description 218 includes a number of leafs 234-1, 234-2, 234-3, 238-1, 238-2, 242-1, 242-2, 246-1, 246-2, 246-3, 250-1, 254-1, and 254-2 connected to the number of nodes. For instance, as shown in the example illustrated in FIG. 2, leafs 234-1, 234-2, and 234-3 are connected to node 232, leafs 238-1 and 238-2 are connected to node 236, leafs 242-1 and 242-2 are connected to node 240, leafs 246-1, 246-2, and 246-3 are connected to node 244, leaf 250-1 is connected to node 248, and leafs 254-1 and 254-2 are connected to node 252.

Each leaf represents a variable operating condition of the node (e.g., of the component of the HVAC system of the building represented by the node) to which it is connected. For instance, as shown in the example illustrated in FIG. 2, leafs 234-1, 234-2, and 234-3 represent the water temperature ($T_W$), water velocity ($V_W$), and water pressure ($P_W$), respectively, of the chiller of the HVAC system of the building represented by node 232. Leafs 238-1 and 238-2 represent the water temperature ($T_W$) and water velocity ($V_W$), respectively, of the boiler of the HVAC system of the building represented by node 236. Leafs 242-1 and 242-2 represent the air temperature ($T_{A1}$) and air velocity ($V_{A1}$), respectively, of the first AHU of the HVAC system of the building represented by node 240. Leafs 246-1, 246-2, and 246-3 represent the air temperature ($T_{A2}$), air velocity ($V_{A2}$), and air humidity ($h_{A2}$) respectively, of the second AHU of the HVAC system of the building represented by node 244. Leaf 250-1 represents the cooling energy demand ($X_{C1}$) of (e.g., the amount of energy needed to effectively cool) the first space of the HVAC system of the building represented by node 248. Leafs 254-1 and 254-2 represent the cooling energy demand ($X_{C2}$) and the heating energy demand ($X_{H2}$), respectively, of the second space of the HVAC system of the building represented by node 252.

Embodiments of the present disclosure are not limited to the particular nodes, connections between the nodes, or leafs connected to the nodes shown in the example illustrated in FIG. 2. Rather, the nodes, connections between the nodes, and leafs connected to the nodes included in a description of an HVAC system of a building in accordance with the present disclosure may depend on (e.g., correspond to) the components of the HVAC system of that particular building, the relationships between those components, and the variable operating conditions of those components. Accordingly, a building HVAC system description in accordance with the present disclosure can include additional and/or different nodes, connections between nodes, and/or leafs than those illustrated in FIG. 2.

Figure 3:
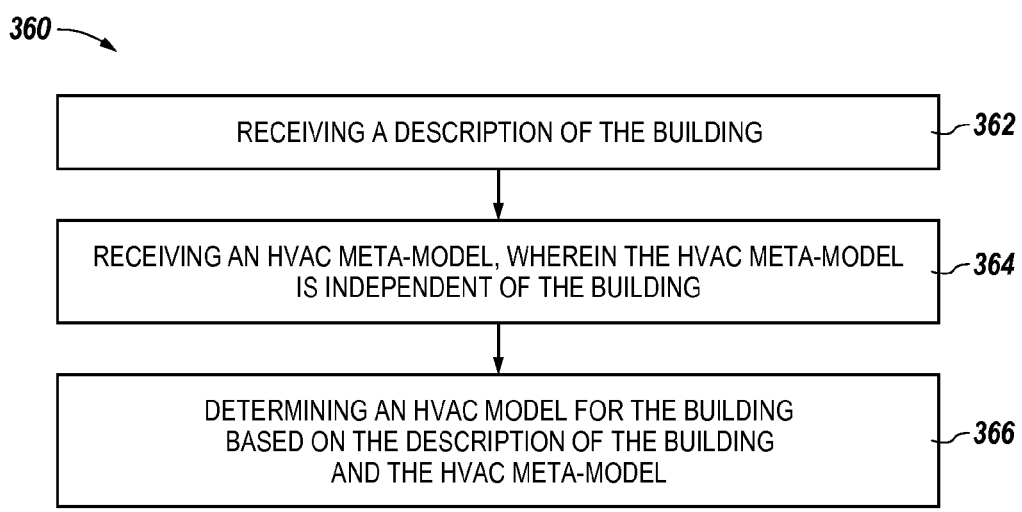
FIG. 3 illustrates a method for determining an HVAC model for a building in accordance with one or more embodiments of the present disclosure.

FIG. 3 illustrates a method 360 for determining (e.g., deriving) an HVAC model for a building in accordance with one or more embodiments of the present disclosure. Method 360 can be performed, for example, by system 100 (e.g., computing device 110) described in connection with FIG. 1.

At block 362, method 360 includes receiving a description of the building. The description of the building can be, for example, building description 118 and/or 218 previously described in connection with FIGS. 1 and 2, respectively, and can be received from application engineer 126, as previously described in connection with FIG. 1.

At block 364, method 360 includes receiving an HVAC meta-model, wherein the HVAC meta-model is independent of the building. The HVAC meta-model can be, for example, HVAC meta-model 120 previously described in connection with FIG. 1, and can be received from a source other than application engineer 126 (e.g., control engineer 128), as previously described in connection with FIG. 1.

At block 366, method 360 includes determining an HVAC model for the building based on the description of the building and the HVAC meta-model. The HVAC model for the building can be, for example, building HVAC model 124 previously described in connection with FIG. 1, and can be determined by HVAC model derivation algorithm 122, as previously described in connection with FIG. 1.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computer implemented method for determining a heating, ventilation, and air conditioning (HVAC) model for a building, comprising:
    receiving, by a processor, a description of the building from a user, wherein the description of the building includes physical connections between components of an HVAC system of the building;
    receiving, by the processor, an HVAC meta-model, wherein the HVAC meta-model is independent of the building;
    determining, by the processor, a predictive HVAC model for the building based on the description of the building and the HVAC meta-model; and
    using, by the processor, the predictive HVAC model for the building to control the HVAC system of the building based on predicted operating conditions of the components of the HVAC system, wherein the predicted operating conditions include a predicted water temperature and a predicted water velocity of a boiler of the HVAC system.

2. The method of claim 1, wherein the description of the building includes contextual information about the building.

3. The method of claim 1, wherein the HVAC meta-model includes a number of rules for determining an HVAC model.

4. The method of claim 3, wherein the number of rules for determining an HVAC model define a structural relationship between a number of inputs, outputs, and disturbances of the HVAC model.

5. The method of claim 3, wherein the number of rules for determining an HVAC model include a number of rules for aggregated variables and parameters of the HVAC model.

6. The method of claim 3, wherein the method includes determining the predictive HVAC model for the building by applying the number of rules for determining an HVAC model to the description of the building.

7. A computing device for determining a heating, ventilation, and air conditioning (HVAC) model for a building, comprising:
    a user interface configured to receive a description of an HVAC system of the building from a user, wherein the description of the HVAC system of the building includes a chain of equipment that connects components of the HVAC system of the building;
    a building independent HVAC meta-model;
    a memory; and
    a processor configured to execute executable instructions stored in the memory to:
        automatically derive a predictive HVAC model for the building based on the description of the HVAC system of the building and the building independent HVAC meta-model; and
        use the predictive HVAC model for the building to control the HVAC system of the building based on predicted operating conditions of the components of the HVAC system, wherein the predicted operating conditions include a predicted water temperature, a predicted water velocity, and a predicted water pressure of a chiller of the HVAC system.

8. The computing device of claim 7, wherein the description of the HVAC system of the building includes a number of connected nodes, wherein each node represents a different component of the HVAC system of the building.

9. The computing device of claim 8, wherein the description of the HVAC system of the building includes a number of leafs connected to the number of nodes, wherein each leaf represents a variable operating condition of the node to which it is connected.

10. The computing device of claim 7, wherein the building independent HVAC meta-model is a default setup of the computing device.

11. The computing device of claim 7, wherein the predictive HVAC model for the building is configured to detect problems associated with the HVAC system of the building.

12. A non-transitory computer readable medium having computer readable instructions stored thereon that are executable by a processor to:
    determine a predictive heating, ventilation, and air conditioning (HVAC) model for a building based on:
        a description of the building received from a user, wherein the description of the building includes variable operation conditions of a number of components of an HVAC system of the building; and
        an HVAC meta-model, wherein the HVAC meta-model is a building independent HVAC model description; and
    use the predictive HVAC model for the building to control the HVAC system of the building based on predicted operating conditions of the number of components of the HVAC system, wherein the predicted operating conditions include a predicted air temperature, a predicted air velocity, and a predicted air humidity of an air handling unit of the HVAC system.

13. The computer readable medium of claim 12, wherein the description of the building is model independent.

14. The computer readable medium of claim 12, wherein the predictive HVAC model for the building includes a final structure for the predictive HVAC model.

15. The computer readable medium of claim 12, wherein the predictive HVAC model for the building is configured to simulate operation of the HVAC system of the building.

16. The computer readable medium of claim 12, wherein the user from which the description of the building is received is an application engineer of the building.

17. The computer readable medium of claim 12, wherein the HVAC meta-model is received from a control engineer.

* * * * *